Patented Sept. 11, 1928.

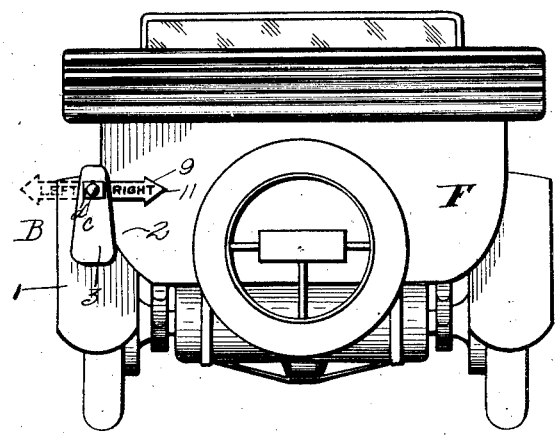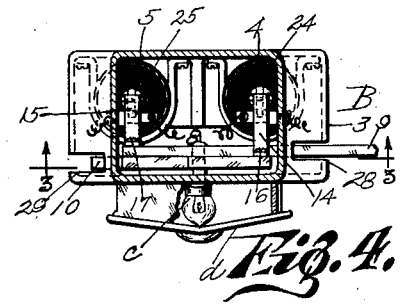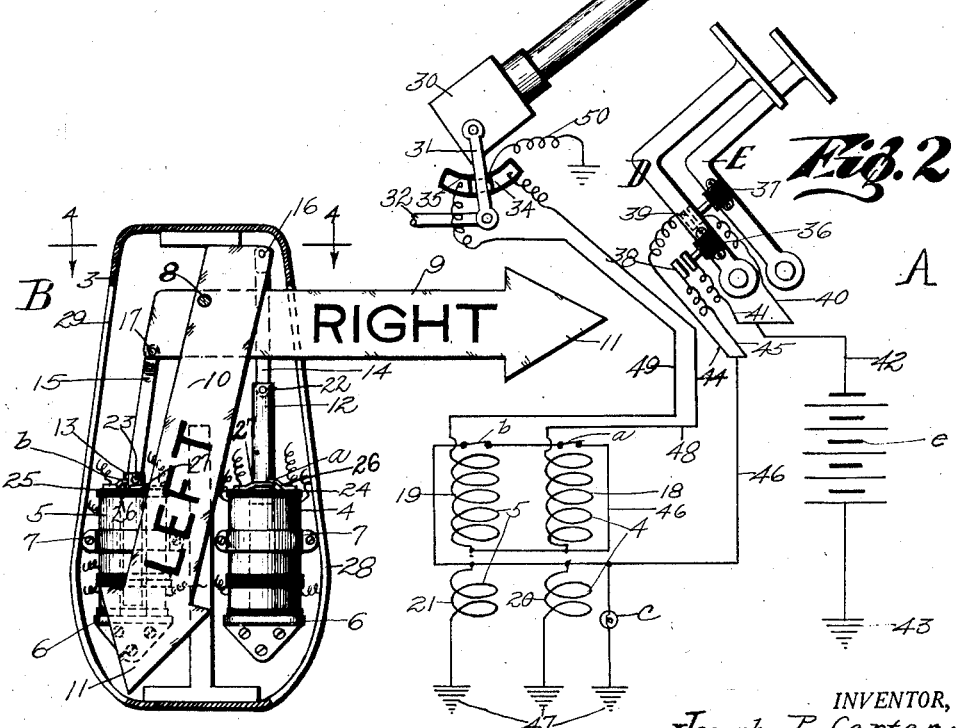

1,683,818

UNITED STATES PATENT OFFICE.

JOSEPH P. CARTER, OF LOS ANGELES, CALIFORNIA.

VEHICLE SIGNALING MEANS.

Application filed October 27, 1921. Serial No. 510,704.

This invention relates to signals and signaling systems, and particularly to that class of signals which are adapted to be associated with a vehicle at the rear or front thereof for indicating to a following or approaching vehicle driver a turning movement of said vehicle. The invention has for an object the provision of a signal and signaling system which is adapted to automatically operate upon a turning movement of the vehicle, independently of any special action on the part of the driver. A further object is the provision of a device of the character stated, which obviates the necessity of arm signaling, and which device will be superior in point of relative simplicity and inexpensiveness of construction taken in conjunction with utility, durability and general efficiency and serviceability.

In practicing the invention I provide a suitable signal member which may consist of two semaphore arms maintained in a suitable housing and adapted to have one or the other of said arms projected therefrom responsive to a turning movement of the steering wheel of the vehicle. The semaphore arms are operated by a duplex solenoid system and in which the two windings of the solenoid are associated with a suitable source of current supply with electrical switches interposed in said circuit, certain of said switches being associated with the steering wheel or mechanism operated by said steering wheel, as well as switches associated with the clutch pedal arm and a brake pedal arm. Upon approaching a corner a driver will ordinarily involuntarily either throw out his clutch or throw out the clutch and put on the brake. When this is done a light member carried by the signal member will become illuminated, both solenoids having one of the coil windings energized. When the driver turns the steering wheel one or the other of the contacts will complete a circuit to one or the other of the windings on the solenoids. This will immediately energize the solenoid coil sufficiently to pull the solenoid core downwardly within the coil and lift either the right semaphore arm or the left semaphore arm from the box. The lighting member carried by the box will illuminate said semaphore. Upon returning the steering wheel to neutral position so that the wheels are straight, the circuit through the switch or switches carried by said steering wheel will be broken, but the second coil on the solenoid or solenoids will still remain energized sufficiently to hold the semaphore arm in position of visibility until such time as the clutch is released or the brake released, or both released, whereupon the semaphore arm will drop within its housing and the light extinguished.

It will thus be seen that a device of this character will be extremely useful, not requiring any particular attention on the part of the operator, doing away with all forms of switch arms that must be operated manually by grasping the same with the hand or moving the same by the foot. The device is intended to be so arranged that no extra motion to operate the device is necessary, further than the operation usually attendant upon moving the clutch or brake, or turning the wheel, which in all cases must be done. The invention contains few parts, is thoroughly reliable and positive in its operation, simple in construction and is practically fool proof.

With the above mentioned and other objects in view, the invention consists in the novel and useful provision, formation, construction, combination, association and interrelation of parts, members and features, as illustrated in some of its embodiments in the accompanying drawing, described in the following detailed statement, and finally pointed out in the claim.

In the drawing:

Figure 1 is an end view of a motor vehicle incorporating a signal device used in conjunction with a signaling system;

Figure 2 is a diagrammatic view illustrating the switch members and the electrical circuits used for operating said signaling system;

Figure 3 is a cross sectional view of the signaling member, said view being taken on the line 3—3 of Figure 4, and looking in the direction of the appended arrows; and, Figure 4 is a fragmentary cross sectional view of the said signaling member, taken on the line 4—4 of Figure 3, with the illuminating means and its cap removed for clearness of illustration.

Corresponding parts in all the figures are designated by the same reference characters.

Referring with particularity to the drawing, the improved self-operating signaling system is designated in its entirety by A, of which B is a signaling member, C a steering device such as used in conjunction with horseless vehicles, D and E clutch and brake members, such as used in motor vehicles for controlling operation of said vehicle, all of which elements may be used in practicing one embodiment of the invention. At the outset I wish to be understood as not confining this invention for use in automobiles, trucks and the like, as the said signaling device and signaling system may be utilized in aeroplanes, dirigibles, boats, etc. without in any manner departing from the spirit of the invention.

The signaling member B may be placed at the rear of an automobile F by attaching the same to a fender 1 or to a car body 2, as desired. The said signaling member B includes a housing member 3 which may be of any shape and within said housing member are two solenoids 4 and 5, which are carried upon suitable brackets 6 within the housing, and likewise maintained in upright position on said brackets by means of straps 7 passing over said solenoids with the ends of said straps detachably joined with the casing or housing 3. Pivotally joined as at 8 to the interior of the housing 3 are two semaphore arms 9 and 10, one of which has the legend "Right" thereon and the other of which has the legend "Left" thereon. Said semaphore arms may be in the form of an arrow; that is to say, having pointed extremities as 11. Each solenoid is provided with a core member 12 and 13 and pivotally connected to said core members are arms 14 and 15, the arm 14 being pivotally joined as at 16 to the semaphore arm 10, and the arm 15 pivotally joined to the semaphore arm 11, as shown at 17. The solenoid windings are of the relay type or duplex type, as shown diagrammatically in Figure 2, that is to say, each solenoid 4 or 5 is provided with one winding as 18 and 19 containing a large amount of wire and smaller windings as 20 and 21 containing a few turns of wire. A particular feature of this signaling member B consists in energizing the large coil of one or the other of the solenoids, then cutting off said coil while maintaining the small coil member in one or the other of the solenoids energized. This of course would allow the core member 12 or 13 to remain within its coil and keep the semaphore arm joined therewith extended from the housing 3. This cutting off, so to speak, is accomplished in a novel manner by arranging the pivot point between the core 12 and the arm 14, or the core 13 and the arm 15, so that the pivot pin as 22 or 23 associated with said arms and cores of said solenoids, extends a suitable distance outward from said cores. It will be observed upon reference to Figure 3 that the top members as 24 and 25 of each of the solenoid coils carry switches $a$ and $b$, each switch comprising two spring contact arms 26 and 27 adapted to contact with each other until the core 12 or the core 13 has been received far enough within its respective solenoid coil to allow either the pin 22 or 23 to contact with the arm 27 for either solenoid so as to move said arm from the other, as shown by the left-hand solenoid in Figure 3. When this occurs, the circuit through the switch $b$ would be broken, which of course would break the circuit through the large coil 19. The signaling member likewise carries an illuminating means $c$ provided with a reflecting member $d$, which illuminating means is adapted to have its rays directed, through the medium of the reflecting members, along the semaphore arm when one or the other of said semaphore arms is in position of observance, as illustrated in the figures. Of course the housing member would of necessiay be provided with openings as 28 and 29 so as to permit the semaphore arms either 9 or 10 to be projected from said housing.

Referring to Figure 2 the steering mechanism C includes the usual worm box 30 which operates arm members 31 and 32 communicating with the steering knuckle to move the front wheels or rear wheels of the vehicle upon turning steering wheel 33, so that a turning movement of the vehicle may be effected. The arm 31 of course may oscillate in one direction or the other and if it moves a short distance it will engage one or the other of the contacts 34 and 35. Likewise the clutch member D, as well as the brake member E carry a spring pressed contact member 36 and 37, respectively, which engage with other contact members 38 or 39 when either the clutch member D or the brake member E is pressed inwardly.

Tracing the electrical circuits it will be observed that conductor members 40 and 41 connect the contact members 36 and 37 and likewise communicate and connect with a source of current supply through a conductor 42. The source of current supply $e$ in turn has one of its terminals grounded, as shown at 43. The contact members 38 and 39 are electrically connected by conducting members 44 and 45, with said conducting members joined with a wire or other conductor 46 to one terminal of the illuminating member $c$, as well as to one terminal of the coil members 20 and 21, and thence through the switch members $a$ and $b$ and to one terminal of the coil members 18 and 19. The other terminal of the illuminating means $c$ and the two coils 20 and 21 is grounded as shown at 47. The other terminal of the coil 18 is led through a suitable conductor 48 to a connection with the contact 34, and the other terminal of the coil 19 leads through a suitable conductor 49 to the contact 35. The lever arm 31 which constitutes a switch member is grounded through a suitable conductor 50. It will thus be seen that I have completed an electrical circuit system which is useful for signaling purposes. If we trace a circuit, for instance, depress the clutch member D, the contact member 36 will contact with the member 38, and a circuit will immediately be made through the current supply means e, the coil members 20 and 21 and the illuminating means c. If the wheel 33 is rotated slightly to the right, the arm 31 will move clockwise and contact with the member 35 which will complete an electrical circuit through the coil 19, drawing the core 13 within the coil as illustrated in Figure 3, thus raising the semaphore arm 9 outward from the housing 3 into position of visibility. After the core has reached, or nearly reached its limit of movement within the coil 5, the pin member 23 will break the circuit through the switch b by depressing the contact arm 27. It will thus be evident that if the wheel member were turned still further to the right it would not affect the circuit through the coil 19, as that circuit has been broken. As a result, the operator of a vehicle if he wishes to turn a certain direction and yet give warning to an approaching or following vehicle, might conveniently do so by throwing out the clutch or slightly depressing the brake member and giving the wheel member a slight turn, which would operate the semaphore, then turn the wheel back to neutral position and continue in a straight line until he desired to fully execute a turn upon approaching a corner or other position in a street or roadway. The coil 21 or 20 has a sufficient number of turns of wire so that it will maintain the core member 13 within the coil until a releasing of either the brake or the clutch will break the circuit through the contact members 36 and 38 or 37 and 39, whereupon the semaphore arm 9 or 10 will drop back within the casing or housing 3.

Further statement of the invention will possibly seem superfluous and the operation of the device is so obvious that a further description of said operation and the method of utilizing the invention will be unnecessary.

It is obvious that many changes and variations and modifications may be made in departure from the particular description and showing of the accompanying drawing, in adapting the invention to varying conditions of use and service, without departing from the true spirit of the invention.

Having thus disclosed my invention, I claim and desire to secure by Letters Patent:

A vehicle provided with the usual steering mechanism and pedal controlled members, in combination with a signaling member provided with signaling means for indicating a turning movement of said vehicle, means connected with a source of electrical energy whereby said signaling member is energized upon depression of one of said pedal controlled members, means connected with said steering mechanism to expose to view the signaling means of the signaling member to indicate a turning movement of the vehicle upon movement of the steering mechanism, and means for maintaining said signal in exposed position until release of the depressed pedal controlled member.

In testimony whereof, I have signed my name to this specification.

JOSEPH P. CARTER.